US012620689B2

(12) United States Patent
Jian et al.

(10) Patent No.: US 12,620,689 B2
(45) Date of Patent: May 5, 2026

(54) ELECTRONIC DEVICE

(71) Applicant: VIVO MOBILE COMMUNICATION CO., LTD., Dongguan (CN)

(72) Inventors: Xianjing Jian, Dongguan (CN); Yijin Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 142 days.

(21) Appl. No.: 18/539,567

(22) Filed: Dec. 14, 2023

(65) Prior Publication Data

US 2024/0128633 A1 Apr. 18, 2024

Related U.S. Application Data

(63) Continuation of application No. PCT/CN2022/098923, filed on Jun. 15, 2022.

(30) Foreign Application Priority Data

Jun. 16, 2021 (CN) ........................ 202110664817.9

(51) Int. Cl.
*H01Q 1/22* (2006.01)
*H01Q 1/36* (2006.01)

(52) U.S. Cl.
CPC ................ *H01Q 1/22* (2013.01); *H01Q 1/36* (2013.01)

(58) Field of Classification Search
CPC ........... H01Q 1/22; H01Q 1/243; H01Q 1/36; H01Q 21/08; H01Q 21/28; H01Q 5/40; H01Q 9/0485
See application file for complete search history.

(56) References Cited

U.S. PATENT DOCUMENTS 6,008,775 A * 12/1999 Bobowicz ................ H01Q 3/26 343/778
2004/0183739 A1* 9/2004 Bisiules ................ H01Q 5/378 343/793

(Continued)

FOREIGN PATENT DOCUMENTS

CN 207021381 U 2/2018
CN 109193147 A 1/2019

(Continued)

OTHER PUBLICATIONS

Zhu, Xiongzhi et al., "A Miniaturized Dielectric-Resonator Phased Antenna Array with 3D-Coverage for 5G Mobile Terminals", 2018 IEEE 5G World Forum (5GWF), IEEE, Jul. 9, 2018, pp. 343-346.

*Primary Examiner* — Thien M Le
(74) *Attorney, Agent, or Firm* — The Webb Law Firm

(57) ABSTRACT

An electronic device, which includes a frame body, where the frame body includes a first metal arm and a second metal arm, and the first metal arm and the second metal arm define a fracture therebetween, and the first metal arm is coupled to the second metal arm via the fracture; and the electronic device further includes a dielectric radiator, a feeding structure, and a transmission line, where the feeding structure is provided on the dielectric radiator. The feeding structure is electrically connected to a radio frequency module of the electronic device via the transmission line, and the dielectric radiator is at least partially located within the fracture; where a radio frequency signal output by the radio frequency module excites, via the feeding structure, the dielectric radiator to radiate.

9 Claims, 4 Drawing Sheets

(56) References Cited

U.S. PATENT DOCUMENTS

| | | | | |
|---|---|---|---|---|
| 2007/0252778 | A1* | 11/2007 | Ide | H01Q 9/0485 343/700 MS |
| 2008/0115757 | A1* | 5/2008 | Quiring | F16F 15/283 123/192.2 |
| 2014/0347225 | A1 | 11/2014 | Harper | |
| 2020/0280131 | A1 | 9/2020 | Avser et al. | |
| 2022/0128005 | A1* | 4/2022 | Smith | F02K 3/06 |
| 2022/0209403 | A1* | 6/2022 | Li | H01Q 1/243 |
| 2022/0407218 | A1* | 12/2022 | Guo | H01Q 5/328 |
| 2023/0246335 | A1* | 8/2023 | Wu | H01Q 5/335 343/893 |
| 2023/0339312 | A1* | 10/2023 | Schneider | B60K 7/0007 |
| 2025/0062533 | A1* | 2/2025 | Ye | H01Q 5/50 |

FOREIGN PATENT DOCUMENTS

| | | | |
|---|---|---|---|
| CN | 110350307 | A | 10/2019 |
| CN | 111106437 | A | 5/2020 |
| CN | 111478048 | A | 7/2020 |
| CN | 111478049 | A | 7/2020 |
| CN | 211350950 | U | 8/2020 |
| CN | 211556114 | U | 9/2020 |
| CN | 111740219 | A | 10/2020 |
| CN | 111969304 | A | 11/2020 |
| CN | 112003018 | A | 11/2020 |
| CN | 112467389 | A | 3/2021 |
| CN | 112542698 | A | 3/2021 |
| CN | 213278390 | U | 5/2021 |
| CN | 113394553 | A | 9/2021 |

* cited by examiner

ELECTRONIC DEVICE

CROSS-REFERENCE TO RELATED APPLICATIONS

This application is a Bypass Continuation application of International Patent Application No. PCT/CN2022/098923, filed Jun. 15, 2022, and claims priority to Chinese Patent Application No. 202110664817.9, filed Jun. 16, 2021, the disclosures of which are hereby incorporated by reference in their entireties.

BACKGROUND OF THE INVENTION

Field of the Invention

The present disclosure relates to the technical field of antennas, and to an electronic device.

Description of Related Art

With the development of the fifth-generation mobile communication technology, millimeter-wave antennas are gradually applied to small electronic devices such as mobile phones and tablets. However, in a case of maintaining the overall size of an electronic device, increasing a millimeter-wave antenna reduces the effective radiation space allocated to each antenna, thereby affecting the overall radiation performance of the antenna.

It can be seen that in the related art, the antenna of the electronic device has the problem of poor radiation performance.

SUMMARY OF THE INVENTION

The present disclosure provides an electronic device.

An embodiment of the present disclosure proposes an electronic device, which includes a frame body, where the frame body includes a first metal arm and a second metal arm, and there is a fracture between the first metal arm and the second metal arm, and the first metal arm and the second metal arm are coupled and connected through the fracture; and the electronic device further includes a dielectric radiator, a feeding structure, and a transmission line, where the feeding structure is disposed on the dielectric radiator, the feeding structure is electrically connected to a radio frequency module of the electronic device through the transmission line, and the dielectric radiator is at least partially located within the fracture; where a radio frequency signal output by the radio frequency module excites, through the feeding structure, the dielectric radiator to radiate.

BRIEF DESCRIPTION OF THE DRAWINGS

The foregoing and/or additional aspects and advantages of the present disclosure will become apparent and readily understandable from the descriptions of the embodiments with reference to the following accompanying drawings.

DESCRIPTION OF THE INVENTION

Figure 1:
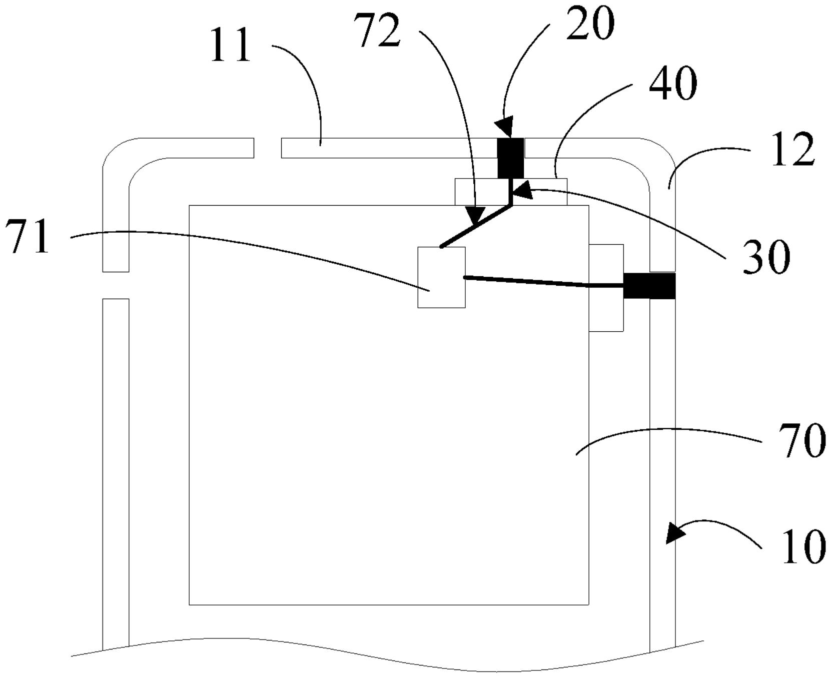
FIG. 1 is a schematic diagram of a structure of an electronic device according to an embodiment of the present disclosure.
Figure 2:
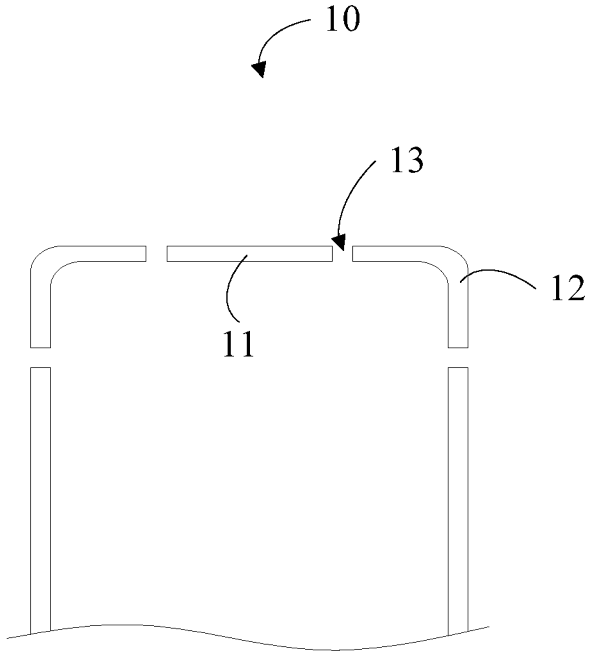
FIG. 2 is a schematic structural diagram of a frame body according to an embodiment of the present disclosure.

The following describes embodiments of the present disclosure. Examples of the embodiments are illustrated in the accompanying drawings. Reference numerals which are the same or similar throughout the accompanying drawings represent identical or similar elements or elements having identical or similar functions. The embodiments described below with reference to the accompanying drawings are exemplary and only used to explain the present disclosure, and cannot be understood as a limitation on the present disclosure. All other embodiments obtained by a person of ordinary skill in the art based on the embodiments of the present disclosure shall fall within the protection scope of the present disclosure.

Features of terms “first” and “second” in the specification and claims of the present disclosure may explicitly or implicitly include one or more such features. In the descriptions of the present disclosure, unless otherwise specified, “a plurality of” means two or more. In addition, in the specification and the claims, “and/or” represents at least one of connected objects, and a character “/” generally represents an “or” relationship between associated objects.

In the descriptions of the embodiments of the present disclosure, unless otherwise specified and defined explicitly, the terms “mount”, “connect”, and “join” should be understood in their general senses. For example, they may refer to a fixed connection, a detachable connection, or an integral connection, may refer to a mechanical connection or an electrical connection, and may refer to a direct connection, an indirect connection via an intermediate medium, or an internal communication between two elements. A person of ordinary skill in the art can understand meanings of these terms in the present disclosure as appropriate to specific situations.

As shown in FIG. 1 to FIG. 8, an embodiment of the present disclosure provides an electronic device, which includes a frame body 10, where the frame body 10 includes a first metal arm 11 and a second metal arm 12, and there is a fracture 13 between the first metal arm 11 and the second metal arm 12, and the first metal arm 11 and the second metal arm 12 are coupled and connected through the fracture 13.

The electronic device further includes a dielectric radiator 20, a feeding structure 30, and a transmission line 40. The feeding structure 30 is disposed on the dielectric radiator 20, the feeding structure 30 is electrically connected to a radio frequency module 71 of the electronic device through the transmission line 40, and the dielectric radiator 20 is at least partially located within the fracture 13.

A radio frequency signal output by the radio frequency module excites the dielectric radiator 20 through the feeding structure 30.

In this embodiment, the first metal arm 11 and the second metal arm 12 can be metal arm radiators of the electronic device, and can be radiators that realize a radiation function of a first antenna of the electronic device; and the dielectric radiator 20 can be a radiator that realizes a radiation function of a second antenna of the electronic device, that is, the radio frequency module 71, the dielectric radiator 20, the feeding structure 30 and the transmission line 40 may constitute the second antenna of the electronic device.

In some embodiments, the radiator that realizes the radiation function of the first antenna of the electronic device may be the first metal arm 11, or the second metal arm 12, or the combination of the first metal arm 11 and the second metal arm 12.

It can be understood that the radio frequency module 71 can be arranged on a motherboard 70 or a circuit board of the electronic device, and the dielectric radiator 20 as the radiator of the second antenna can be located in the fracture 13, that is, the dielectric radiator 20 is located in the fracture 13 between the first metal arm 11 and the second metal arm 12, so that the radiator of the second antenna can reuse the design space of the metal arm radiator, thereby reducing the installation space required by the radiator of the second antenna and avoiding the problem of reducing the effective radiation space of each antenna of the electronic device, so as to achieve the purpose of improving the overall radiation performance of the antennas of the electronic device.

Moreover, by arranging the radiator of the second antenna in the fracture of the first antenna, this can also avoid separately setting an opening or a fracture on the frame body 10 for accommodating the radiator of the second antenna, and reduce the appearance impact of the radiator of the second antenna on the electronic device. At the same time, the number of openings or fractures on the frame body 10 can be reduced, and the structural stability and reliability of the frame body 10 can be also improved.

In an example, a radiation frequency band of the first antenna can be 1450 MHz to 7.125 GHz, that is, the first antenna can be a Sub-6G antenna; a radiation frequency band of the second antenna can be 24.25 GHz to 43 GHz, that is, the second antenna can be a millimeter wave antenna.

In the case that the second antenna is a millimeter wave antenna, the dielectric radiator 20 may be a dielectric block or a dielectric body made of a material with a high dielectric constant. In this way, since the dielectric radiator 20 with a high dielectric constant is at least partially arranged in the fracture 13, and the dielectric radiator 20 is excited by the feeding structure 30 to form a dielectric resonant antenna, an opening or a fracture separately provided on the frame body 10 for accommodating the dielectric radiator 20 can be avoided.

Optionally, the dielectric radiator 20 is made of a material with a high dielectric constant such as ceramics, and the shape of the dielectric radiator 20 may be a cuboid, a cube, a cylinder, or the like.

Optionally, as shown in FIG. 3 to FIG. 6, the dielectric radiator 20 includes a first end face (not shown), a second end face 21, and a side wall (not shown), the first end face is an end face of the dielectric radiator 20 exposed out of the fracture 13, the second end face 21 is an end face of the dielectric radiator 20 away from the first end face, two ends of the side wall are respectively adjacent to the first end face and the second end face 21, and the feeding structure 30 is arranged on the second end face 21 or on the side wall.

As shown in FIG. 1, that the first end face is the end face of the dielectric radiator 20 exposed out of the fracture 13 can be understood as that the first end face is an end face of the dielectric radiator 20 that is flush with an outer side wall of the first metal arm 11, or can be understood as that the first end face is an end face of the dielectric radiator 20 on a side close to the outer side wall of the first metal arm 11.

Figure 3:
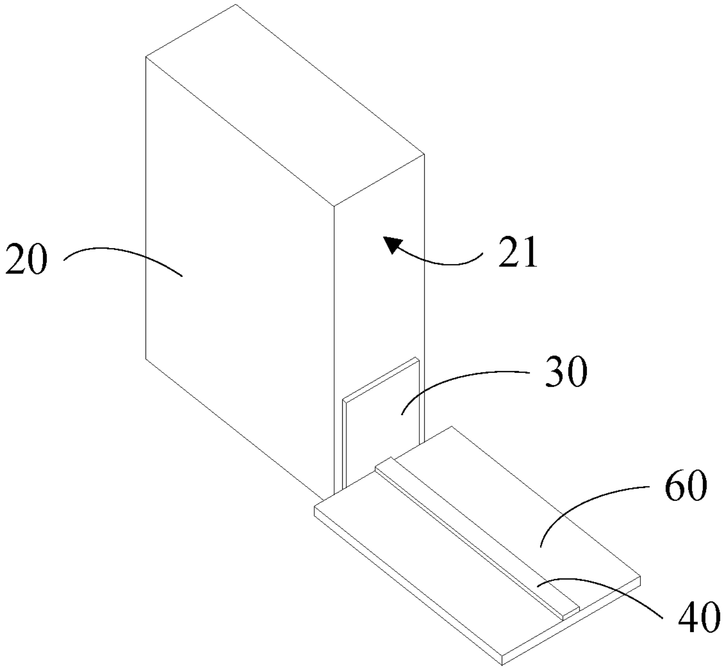
FIG. 3 is a structural schematic diagram 1 of a second antenna according to an embodiment of the present disclosure.
Figure 4:
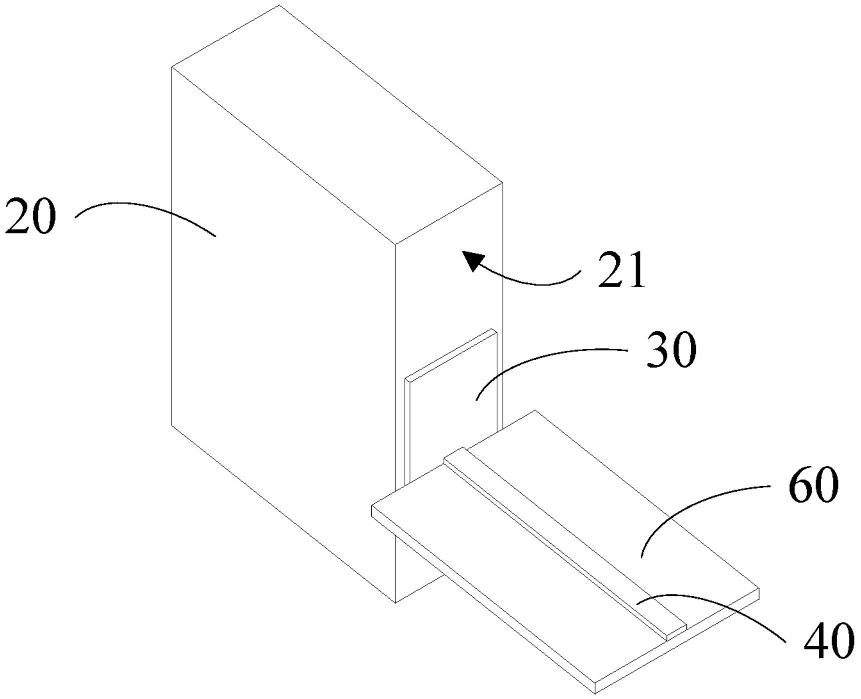
FIG. 4 is a structural schematic diagram 2 of a second antenna according to an embodiment of the present disclosure.
Figure 5:
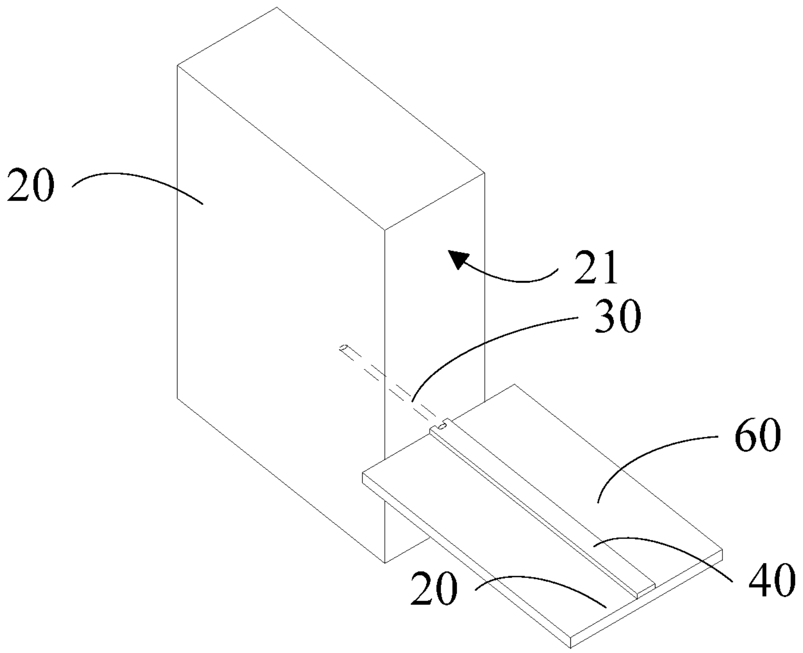
FIG. 5 is a structural schematic diagram 3 of a second antenna according to an embodiment of the present disclosure.
Figure 6:
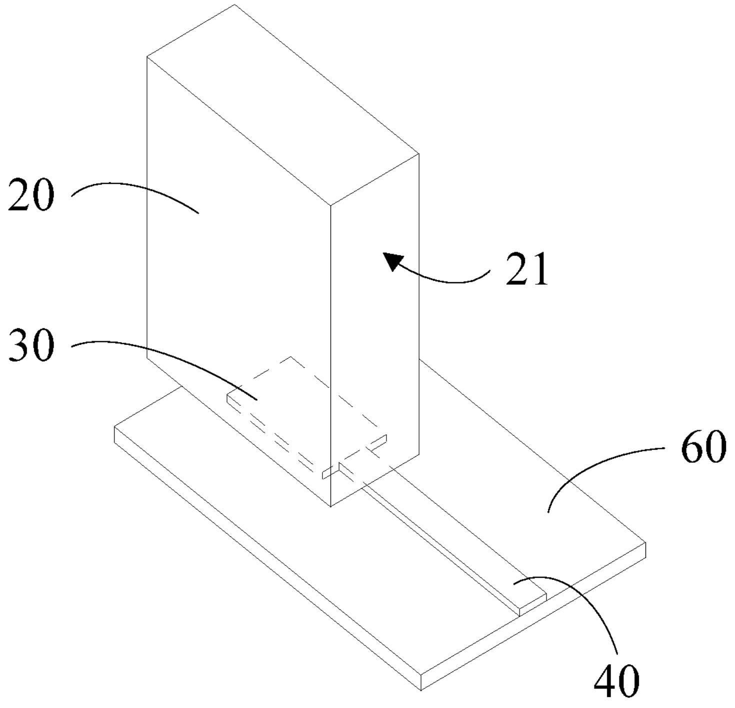
FIG. 6 is a structural schematic diagram 4 of a second antenna according to an embodiment of the present disclosure.

In this embodiment, since the first end face is the end face of the dielectric radiator 20 exposed out of the fracture 13, and as shown in FIG. 3 to FIG. 5, the feeding structure 30 is provided on the second end face 21, the dielectric radiator 20 can generate a radiation signal from the second end face 21 to the first end face. As shown in FIG. 6, when the feeding structure 30 is provided on the side wall, the dielectric radiator 20 can generate a radiation signal perpendicular to the direction of the side wall. That is, by adjusting the arrangement position of the feeding structure 30, the radiation direction of the dielectric radiator 20 can be adjusted, thereby optimizing the antenna radiation performance of the electronic device.

In one of the embodiments, the fracture 13 is a fracture on a short frame of the frame body 10 and the feeding structure 30 is arranged on the second end face 21, the dielectric radiator 20 can generate a radiation signal perpendicular to the short frame. Correspondingly, when the fracture 13 is a fracture on a long frame of the frame body 10 and the feeding structure 30 is arranged on the second end face 21, the dielectric radiator 20 can generate a radiation signal perpendicular to the long frame.

When the short frame and the long frame of the frame body 10 are both provided with fractures, and the fractures are both provided with a dielectric radiator 20, a dual polarization or multi-input multi-output antenna architecture can be satisfied, and which can also be used for millimeter wave communications and ranging and angle measurement for millimeter wave radars.

As shown in FIG. 6, when the feeding structure 30 is arranged on a side wall parallel to the display surface of the electronic device, the feeding structure 30 can excite the dielectric radiator 20 to generate a radiation signal perpendicular to the display surface. When the feeding structure 30 is arranged on a side wall of the dielectric radiator 20 away from the display surface, the feeding structure 30 can excite the dielectric radiator 20 to generate radiation in the direction toward display surface, so as to realize radiation signal coverage toward the display surface in the ultimate full-screen scenarios, for example, millimeter wave signal coverage toward the screen is realized.

Correspondingly, when the feeding structure 30 is arranged on the side wall of the dielectric radiator 20 facing the display surface, the feeding structure 30 can excite the dielectric radiator 20 to generate radiation in a direction toward a rear cover of the electronic device, so as to realize radiation signal coverage toward the rear cover.

It can be understood that, when the feeding structure 30 is arranged on the second end face 21, the feeding structure 30 can be arranged in the middle area of the second end face 21, or can be arranged in the edge area of the second end face 21. Correspondingly, when the feeding structure 30 is arranged on the side wall, the feeding structure 30 may be arranged in the middle area of the side wall, or may be arranged on an area of the side wall near the second end face 21.

A arrangement location of the feeding structure 30 on the second end face 21 or the side wall can be designed based on the actual radiation requirement of the dielectric radiator 20.

Optionally, the feeding structure 30 may be a feeding metal sheet, such as a metal sheet; the feeding structure 30 may also be a feeding probe, such as a cylindrical metal post.

When the feeding structure 30 is a feeding metal sheet, the feeding metal sheet can be attached to the second end face 21 or the side wall based on the lamination process, so that the feeding metal sheet excites the dielectric radiator 20. When the feeding structure is a feeding probe, one end of the feeding probe can be embedded in the dielectric radiator 20 through the second end face 21 or the side wall based on the insertion process, so that the feeding probe excites the dielectric radiator 20.

It should be noted that the other end of the feeding probe can be electrically connected to the radio frequency module through the transmission line 40, so as to receive the radio frequency signal output by the radio frequency module.

Optionally, the electronic device further includes a radiator housing (not shown), the radiator housing is wrapping around the dielectric radiator 20, and the dielectric constant of the dielectric radiator 20 is greater than that of the radiator housing.

The feeding structure 30 is connected to the dielectric radiator 20 through penetrating the radiator housing.

In this embodiment, the radiator housing can be covered on the surface of the dielectric radiator 20, so that the dielectric radiator 20 can be better combined with the frame body 10, that is, the dielectric radiator 20 can be better combined with the overall structure of the electronic device, thereby improving the overall appearance of the electronic device.

Moreover, the dielectric constant and shape of the radiator housing can also be selected to improve the radiation performance of the dielectric radiator 20.

The radiator housing can be formed on the surface of the dielectric radiator 20 by injection molding, which can also improve the integrity of the dielectric radiator 20 and the radiator housing.

Figure 7:
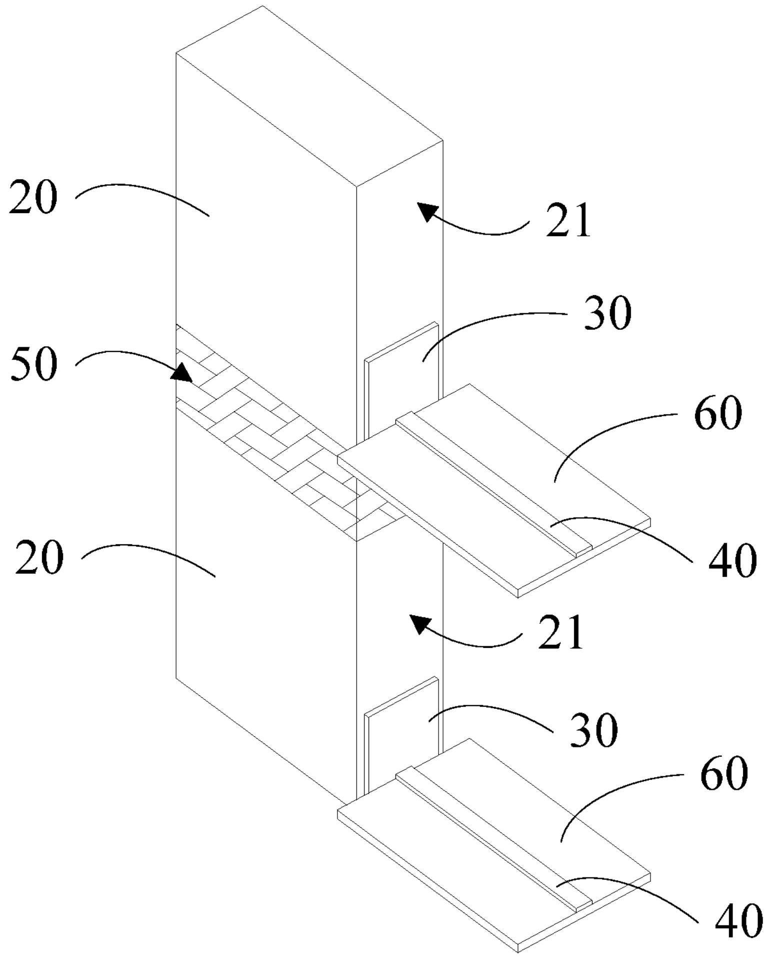
FIG. 7 is a structural schematic diagram 5 of a second antenna according to an embodiment of the present disclosure.

Optionally, as shown in FIG. 7, the electronic device includes at least two dielectric radiators 20, the at least two dielectric radiators 20 are all at least partially located in the fracture 13, and each dielectric radiator 20 is correspondingly provided with a feeding structure 30.

Any two adjacent dielectric radiators 20 of the at least two dielectric radiators 20 are connected and separated by a radiator connector 50, and the dielectric constant of the dielectric radiator 20 is greater than that of the radiator connector 50.

In this embodiment, by arranging at least two dielectric radiators 20 in the fracture 13, the gain of the second antenna can be increased, so that the second antenna has beam scanning capability.

That the at least two dielectric radiators 20 are all at least partially located in the fracture 13 can be understood as that the part of each dielectric radiator and the part of the feeding structure 30 can extend to the inside of the frame body 10, that is, the length of each dielectric radiator along the depth direction of the fracture is set to be larger than the depth of the fracture 13, so that the dielectric radiator can be better connected with the feeding structure 30, avoid the feeding structure 30 from occupying the arrangement space of the dielectric radiator 20 in the fracture 13, reduce the width of the fracture 13 to a certain extent, and improve the appearance of the electronic device.

In some embodiments, at least two dielectric radiators 20 can also share a transmission line 40. In other embodiments, each feeding structure 30 can be provided with a separate transmission line 40, or can be fed by means of power dividing network feeding.

When a plurality of dielectric radiators 20 are provided in the fracture 13, the second antenna can also realize higher frequency millimeter wave communication and radar sensing or terahertz communication and radar sensing.

Optionally, at least two dielectric radiators 20 may be evenly spaced relative to the radiator connector 50 to form a radiator array, so as to increase the gain of the antenna and realize the beam scanning function of the antenna.

Figure 8:
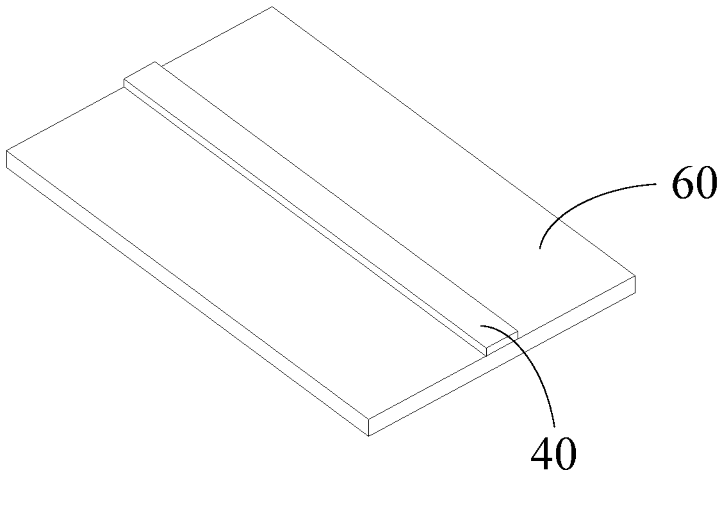
FIG. 8 is a schematic structural diagram of a substrate-transmission line according to an embodiment of the present disclosure.

Optionally, as shown in FIG. 8, the electronic device further includes a substrate 60, and the transmission line 40 may be a microstrip feeder provided on the substrate 60.

Moreover, the electronic device further includes a mainboard 70 on which the radio frequency module is arranged. The radio frequency module can be electrically connected to the microstrip feeder via a radio frequency trace 72 on the mainboard 70 and electrically connected to the feeding structure 30 via the microstrip feeder.

The transmission line 40 may be a stripline structure provided on the substrate 60, or a coplanar waveguide structure, or a flexible circuit board, etc. The material of the transmission line 40 may be liquid crystal polymer or other low-loss materials. Moreover, one end of the transmission line 40 can be directly soldered to a contact of the radio frequency trace 72 on the main board 70, or electrically connected to the mainboard 70 through a board-to-board connector.

The radio frequency signal output by the radio frequency module can be transmitted to the transmission line 40 through the radio frequency trace 72, and then transmitted to the feeding structure 30 through the transmission line 40, and the resonance mode of the dielectric radiator 20 is excited by the feeding structure 30, so that the dielectric radiator 20 generates radiation to realize the radiation function of the second antenna.

In addition, the frame body 10 in the present disclosure may be a metal middle frame or a metal side frame of an electronic device, which may be used as a radiator of an antenna structure of the electronic device.

It should be noted that the electronic device in the present disclosure can be a mobile phone, a tablet computer, a notebook computer, a handheld computer, a vehicle electronic device, a wearable device, an ultra-mobile personal computer (UMPC), a netbook or a personal digital assistant (PDA), etc.

In the description of this specification, the description with reference to the terms such as "an embodiment", "some embodiments", "an illustrative embodiment", "an example", or "some examples" means that a feature, a structure, a material, or a characteristic described with reference to the embodiment or example is included in at least one embodiment or example of the present disclosure. In this specification, the schematic descriptions of the above terms do not necessarily refer to the same embodiment or example. Moreover, the features, structures, materials, or characteristics described may be combined in a proper way in any one or more embodiments or examples.

Although the embodiments of the present disclosure have been shown and described, a person of ordinary skill in the art can understand that various changes, modifications, replacements, and variants may be made to these embodiments without departing from the principle and purpose of the present disclosure, and the scope of the present disclosure is limited by the claims and their equivalents.

What is claimed is:

1. An electronic device, comprising a frame body, wherein the frame body comprises a first metal arm and a second metal arm, and the first metal arm and the second metal arm define a fracture therebetween, and the first metal arm is coupled to the second metal arm via the fracture; and the electronic device further comprises a dielectric radiator, a feeding structure, and a transmission line, wherein the feeding structure is provided on the dielectric radiator, the feeding structure is electrically connected to a radio frequency module of the electronic device via the transmission line, and the dielectric radiator is at least partially located within the fracture; wherein a radio frequency signal output by the radio frequency module excites, via the feeding structure, the dielectric radiator to radiate;

wherein the dielectric radiator comprises a first end face, a second end face, and a side wall, the first end face is an end face of the dielectric radiator exposed out of the fracture, the second end face is an end face of the dielectric radiator away from the first end face, two ends of the side wall are respectively adjacent to the first end face and the second end face, and the feeding structure is arranged on the second end face or on the side wall.

2. The electronic device according to claim 1, wherein the electronic device comprises at least two dielectric radiators, the at least two dielectric radiators are all at least partially located in the fracture, and each of the dielectric radiators is correspondingly provided with the feeding structure; wherein any two adjacent dielectric radiators of the at least two dielectric radiators are connected and separated by a radiator connector, and a dielectric constant of the dielectric radiator is greater than a dielectric constant of the radiator connector.

3. The electronic device according to claim 2, wherein the at least two dielectric radiators are evenly arranged at intervals relative to the radiator connector, and form a radiator array.

4. The electronic device according to claim 1, wherein the electronic device further comprises a substrate, and the transmission line is a microstrip feeder provided on the substrate.

5. The electronic device according to claim 4, wherein the electronic device further comprises a mainboard, the radio frequency module is provided on the mainboard, and the radio frequency module is electrically connected to the microstrip feeder via a radio frequency trace on the mainboard and electrically connected to the feeding structure via the microstrip feeder.

6. The electronic device according to claim 1, wherein the feeding structure is arranged on the side wall parallel to a display surface of the electronic device, to excite the dielectric radiator to generate a radiation signal perpendicular to the display surface.

7. The electronic device according to claim 1, wherein the feeding structure is a feeding metal sheet, and the feeding metal sheet is attached to the second end face or the side wall.

8. The electronic device according to claim 1, wherein the feeding structure is a feeding probe, one end of the feeding probe is plugged into the second end face or the side wall, and the other end is electrically connected to the radio frequency module via the transmission line.

9. The electronic device according to claim 1, wherein the electronic device further comprises a radiator housing, the radiator housing is provided for wrapping around the dielectric radiator, and a dielectric constant of the dielectric radiator is greater than a dielectric constant of the radiator housing; wherein the feeding structure penetrates the radiator housing and is connected to the dielectric radiator.

* * * * *